US009500508B2

(12) United States Patent
Gotou et al.

(10) Patent No.: US 9,500,508 B2
(45) Date of Patent: Nov. 22, 2016

(54) FLUID METER DEVICE

(71) Applicant: Panasonic Intellectual Property Management Co., Ltd., Osaka-shi, Osaka (JP)

(72) Inventors: Hirokazu Gotou, Shiga (JP); Akihisa Adachi, Kyoto (JP); Yuji Fujii, Nara (JP); Yuji Nakabayashi, Nara (JP); Yukio Sakaguchi, Nara (JP); Yasuharu Kawano, Nara (JP); Aoi Watanabe, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 119 days.

(21) Appl. No.: 14/410,937

(22) PCT Filed: Jun. 25, 2013

(86) PCT No.: PCT/JP2013/003971
§ 371 (c)(1),
(2) Date: Dec. 23, 2014

(87) PCT Pub. No.: WO2014/002487
PCT Pub. Date: Jan. 3, 2014

(65) Prior Publication Data
US 2015/0153211 A1   Jun. 4, 2015

(30) Foreign Application Priority Data

Jun. 28, 2012   (JP) ................................ 2012-145025

(51) Int. Cl.
*G01F 1/66* (2006.01)
*G01F 3/22* (2006.01)
(Continued)

(52) U.S. Cl.
CPC .  *G01F 3/22* (2013.01); *G01F 1/66* (2013.01); *G01F 5/00* (2013.01); *G01F 15/04* (2013.01); *G01F 15/07* (2013.01)

(58) Field of Classification Search
CPC ............ G01F 1/66; G01F 1/74; G01F 15/06; G01F 1/20
USPC ............... 73/861.28, 861.04, 861.78, 861.18
See application file for complete search history.

(56) References Cited

U.S. PATENT DOCUMENTS

| 4,365,518 A | * | 12/1982 | Zacharias, Jr. | ........... | G01F 1/66 |
| | | | | | 73/861.28 |
| 4,404,859 A | * | 9/1983 | Ohsawa | .................... | G01F 1/32 |
| | | | | | 73/861.18 |

(Continued)

FOREIGN PATENT DOCUMENTS

| JP | 11-287676 A | 10/1999 |
| JP | 2000-146662 A | 5/2000 |

(Continued)

OTHER PUBLICATIONS

Extended European Search Report in corresponding European Application No. 13808563.4, dated Jun. 11, 2015, 7 pages.

(Continued)

*Primary Examiner* — Jewel V Thompson
(74) *Attorney, Agent, or Firm* — Brinks Gilson & Lione

(57) ABSTRACT

A gas meter device of the present invention comprises plural measurement fluid passages provided in parallel between an inlet into which a fluid flows, and an outlet from which the fluid flows out; flow value measuring sections provided in the measurement fluid passages, respectively, and configured to obtain flow values of fluids flowing through the measurement fluid passages, respectively; memories configured to store coefficient data which are values corresponding to the measurement fluid passages, respectively and indicating a relation between the flow values of the fluids flowing through the measurement fluid passages, respectively, and a total flow value of the fluid flowing from the inlet to the outlet; and total flow value estimation sections configured to estimate total flow values of the fluids based on the flow values obtained by the flow value measuring sections, respectively, and the coefficient data stored in the memories. This makes it possible to reduce time required for adjustment work in manufacturing steps of the fluid meter device assembled by connecting the plural measurement fluid passages in parallel.

5 Claims, 6 Drawing Sheets

(51) Int. Cl.
  *G01F 5/00* (2006.01)
  *G01F 15/04* (2006.01)
  *G01F 15/07* (2006.01)

(56) References Cited

U.S. PATENT DOCUMENTS

| | | | | |
|---|---|---|---|---|
| 4,523,478 | A | * | 6/1985 | Zacharias, Jr. ............ G01F 1/66 73/861.28 |
| 4,542,650 | A | * | 9/1985 | Renken ................ G01F 1/6965 338/319 |
| 5,437,194 | A | * | 8/1995 | Lynnworth ............ G01F 1/662 73/861.27 |
| 5,861,556 | A | | 1/1999 | Nukui et al. |
| 8,544,343 | B2 | * | 10/2013 | Gottlieb ................ G01F 1/667 73/861.28 |
| 2009/0248213 | A1 | | 10/2009 | Gotoh |

FOREIGN PATENT DOCUMENTS

| | | |
|---|---|---|
| JP | 2000-249619 A | 9/2000 |
| JP | 2009-245132 A | 10/2009 |

OTHER PUBLICATIONS

International Search Report in corresponding International Application No. PCT/JP2013/003971, dated Sep. 10, 2013, 2 pages.

* cited by examiner

FLUID METER DEVICE

This application is a 371 application of PCT/JP2013/003971 having an international filing date of Jun. 25, 2013, which claims priority to JP2012-145025 filed Jun. 28, 2012, the entire contents of which are incorporated herein by reference.

TECHNICAL FIELD

The present invention relates to a fluid meter device which measures the flow velocity of a fluid flowing through a fluid passage, and calculates the volumetric flow (flow rate) value of the fluid based on the flow velocity, to derive the usage amount of the fluid.

BACKGROUND ART

In these days, general gas customer houses are attached with membrane gas meters, each of which measures a gas flow value based on the number of times the gas flows through a measuring chamber. Since the membrane gas meter requires a space used to provide therein the measuring chamber of a relatively large volume, in a measurement principle, it is difficult to further reduce the size of the membrane gas meter.

Under the circumstances, in recent years, to realize a small-sized gas meter, an ultrasonic gas meter has been developed. The ultrasonic gas meter includes ultrasonic sensors (transduces or transmitters/receivers) which are attached to the upstream and downstream sides of a fluid passage through which the gas flows, and is configured to measure the flow velocity of the gas flowing through the fluid passage based on the arrival time of an ultrasonic wave, and calculate the volumetric flow value of the gas based on the flow velocity of the gas, thereby deriving the usage amount of the gas. As should be understood, the ultrasonic gas meter is capable of measuring the usage amount of the gas so long as there is provided a fluid passage for measuring the flow value. Therefore, it is easy to reduce the size of the ultrasonic gas meter.

Also, there is a need for development of a gas meter which is capable of measuring the usage amount of the gas for facility such as a factory which consumes a gas of a large amount, instead of the general gas customer houses. As an example of such a gas meter which is capable of measuring a large gas usage amount, there is proposed a fluid meter device configured in such a manner that plural measurement fluid passages (measurement passages) connected to each other in parallel are provided, a pair of transducers (flow value measuring units) are provided in each of the measurement fluid passages, the flow values in separate measurement fluid passages are measured, and a total flow value of these flow values is decided as the flow value of the whole fluid meter device (see Patent Literature 1).

CITATION LIST

Patent Literature

Patent Literature 1: Japanese Laid-Open Patent Application Publication No. Hei 11-287676

SUMMARY OF THE INVENTION

Technical Problem

The above stated fluid meter device according to the prior art is configured to independently measure the flow values of fluids flowing through the separate measurement fluid passages and derive the total flow value by summing up these flow values.

For this reason, it is necessary to perform calibration for each of the separate measurement fluid passages to obtain a correct measurement flow value in each of the separate measurement fluid passages. In other words, the above stated fluid meter device according to the prior art is required to derive the flow value measured when the fluid is flowed at a specified flow value through each of the separate measurement fluid passages and a coefficient used to compensate a difference between this flow value and the specified flow value.

When the fluid is flowed at a large flow value through the fluid meter device assembled by connecting the calibrated separate measurement fluid passages in parallel, and the total flow value is derived by summing up the flow values independently measured in the separate measurement fluid passages, the resulting measurement flow value does not always coincide with an actual flow value. For this reason, it becomes necessary to newly perform calibration for the whole fluid meter device in which the plural measurement fluid passages are placed. This is due to the fact that the state in which the fluid is flowed into the separate measurement fluid passages in the case where the measurement fluid passages are connected in parallel and the fluid is flowed into the measurement fluid passages, is different from the state in which the fluid is flowed into the separate measurement fluid passages in the case where the coefficient is derived by flowing the fluid through each of the separate measurement fluid passages at the specified flow value.

As should be understood from the above, the above stated fluid meter device according to the prior art has a problem that it is necessary to perform calibration for the whole fluid meter device assembled by connecting the plural measurement fluid passages in parallel, after the calibration is performed for each of the separate measurement fluid passages. Therefore, a long time is required for adjustment (calibration) work in manufacturing steps.

The present invention has been made in view of the above described problem, and an object of the present invention is to provide a fluid meter device which is capable of reducing time required for adjustment work in manufacturing steps of the fluid meter device assembled by connecting plural measurement fluid passages in parallel.

Solution to Problem

To achieve the above described object, according to an aspect of the present invention, there is provided a fluid meter device comprising: plural measurement fluid passages provided in parallel between an inlet into which a fluid flows, and an outlet from which the fluid flows out; flow value measuring units provided in the plural measurement fluid passages, respectively, and configured to obtain information of flow values of fluids flowing through the measurement fluid passages, respectively; memories configured to store coefficient data which are values corresponding to the measurement fluid passages, respectively and indicating a relation between the information of flow values of the fluids flowing through the measurement fluid passages, respectively, and a total flow value of the fluid flowing from the inlet to the outlet; and total flow value estimation units configured to estimate total flow values of the fluids corresponding to the measurement fluid passages, respectively, based on the information of the flow values which are obtained by the flow value measuring units, respectively, and the coefficient data stored in the memories.

Advantageous Effects of Invention

The present invention is configured as described above, and has an advantage that it becomes possible to reduce time required for adjustment work in manufacturing steps of a fluid meter device assembled by connecting plural measurement fluid passages in parallel.

DETAILED DESCRIPTION OF THE PREFERRED EMBODIMENTS

Figure 1:
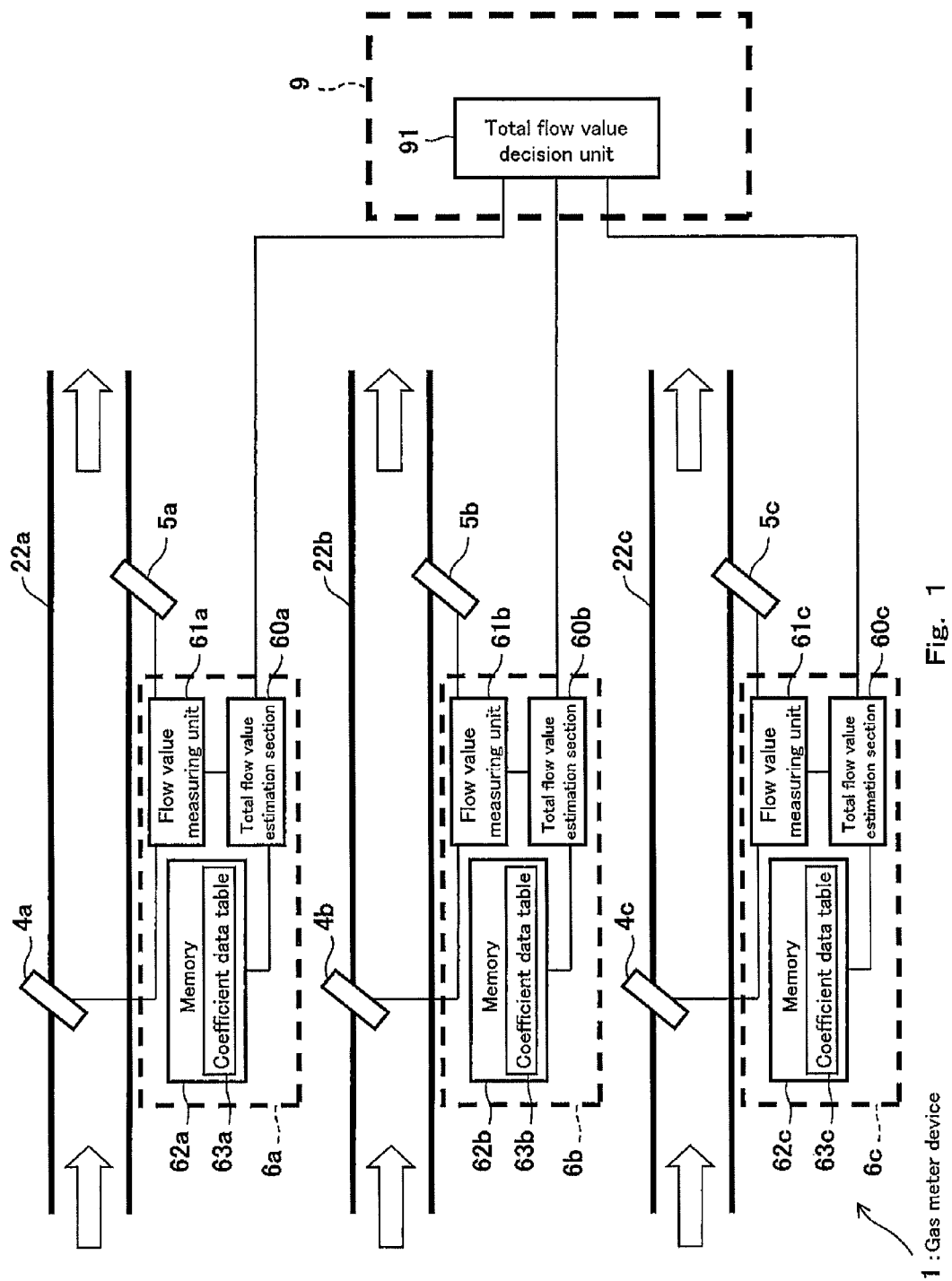
FIG. 1 is a block diagram showing the configuration associated with a flow value measuring process in a gas meter device according to the present embodiment.

According to a first aspect of the present invention, there is provided a fluid meter device comprising: plural measurement fluid passages provided in parallel between an inlet into which a fluid flows, and an outlet from which the fluid flows out; flow value measuring units provided in the plural measurement fluid passages, respectively, and configured to obtain information of flow values of fluids flowing through the measurement fluid passages, respectively; memories configured to store coefficient data which are values corresponding to the measurement fluid passages, respectively and indicating a relation between the information of flow values of the fluids flowing through the measurement fluid passages, respectively, and a total flow value of the fluid flowing from the inlet to the outlet; and total flow value estimation units configured to estimate total flow values of the fluids corresponding to the measurement fluid passages, respectively, based on the information of the flow values which are obtained by the flow value measuring units, respectively, and the coefficient data stored in the memories.

In accordance with this configuration, since the fluid meter device is configured to store the coefficient data and include the flow value measuring units and the total flow value estimation units, the total flow value of the fluid flowing from the inlet to the outlet of the fluid meter device can be derived from the flow value of the fluid flowing through one measurement fluid passage.

By preliminarily deriving the coefficient data from the flow values of the fluids flowing through the measurement fluid passages, when the fluid is flowed into the fluid meter device at a specified flow value in advance, it becomes possible to manufacture the fluid meter device which is capable of measuring the total flow value of the fluid flowing from the inlet to the outlet. Although it is necessary to perform calibration for each of the separate measurement fluid passages and then perform calibration for the whole fluid meter device assembled by connecting the plural measurement fluid passages in parallel, in the conventional example, this is not necessary in the fluid meter device of the present invention. As a result, time required for adjustment work in manufacturing steps can be reduced.

Therefore, the first aspect of the present invention has an advantage that it becomes possible to reduce time required for adjustment work in manufacturing steps of the fluid meter device assembled by connecting the plural measurement fluid passages in parallel.

In addition, in the fluid meter device according to the first aspect of the present invention, the flow value measuring units are provided in the plural measurement fluid passages, respectively. Therefore, even when a failure occurs in the flow value measuring unit provided in a certain measurement fluid passage, and cannot obtain the flow value of the fluid flowing through this measurement fluid passage, the total flow value can be derived from the flow value of the fluid which is obtained in the flow value measuring unit in the other measurement fluid passage.

According to a second aspect of the present invention, the fluid meter device according to the first aspect of the present invention may further comprise a total flow value decision unit configured to obtain the total flow values of the fluids corresponding to the measurement fluid passages, which are estimated by the total flow value estimation units, respectively, and to decide the total flow value of the fluid flowing from the inlet to the outlet, based on the estimated total flow values.

In some cases, the flow values measured and obtained by the flow value measuring units in the measurement fluid passages may contain errors with respect to a true value, due to design errors in the measurement fluid passages through which the fluids flow. Also, the estimated total flow values derived in the measurement fluid passages may in some cases be non-uniform, with an increase/decrease in the total flow value of the fluid flowing through the fluid meter device, due to set accuracy of the stored coefficient data, etc.

In the above configuration, since the fluid meter device includes the total flow value decision unit, the total flow values of the fluids derived in the measurement fluid passages can be obtained, and the total flow value can be decided based on the plural total flow values. As described above, the total flow value derived in each of the measurement fluid passages may contain errors with respect to the true value. However, in the fluid meter device of the present invention, since the total flow value decision can decide the total flow value based on the plural samples (total flow values), the total flow value which is closer to the true value can be obtained.

According to a third aspect of the present invention, in the fluid meter device according to the second aspect of the present invention, the total flow value decision unit may be configured to derive an average flow value of the total flow values of the fluids corresponding to the measurement fluid passages, which are estimated by the total flow value estimation units, respectively, and to decide the average flow value as the total flow value of the fluid flowing from the inlet to the outlet.

In accordance with this configuration, since the total flow value decision unit can decide the total flow value from the average flow value of the plural samples (total flow values), the total flow value which is closer to the true value can be obtained.

According to a fourth aspect of the present invention, the fluid meter device according to the third aspect of the present invention, the total flow value decision unit may be configured to derive the average flow value of the total flow values of the fluids corresponding to the measurement fluid passages, which are estimated by the total flow value estimation units, respectively, except for a largest flow value of the estimated total flow values and a smallest flow value of the estimated total flow values.

In accordance with this configuration, the total flow value decision unit can decide as the total flow value, the average flow value of the plural samples (total flow values). This average flow value is derived from the fluid total flow values which are estimated by the total flow value estimation units, respectively, except for a flow value of the estimated total flow values and a smallest flow value of the estimated total flow values. For this reason, even when the plural samples (total flow values) include an erroneous measurement total flow value, the average flow value can be derived using the total flow values except for the erroneous measurement total flow value. Therefore, the total flow value which is closer to the true value can be obtained.

According to a fifth aspect of the present invention, the fluid meter device according to any one of the first to fourth aspects of the present invention, the coefficient data stored in the memories may be calculated based on the flow values of the fluids which are measured by the flow value measuring units provided in the measurement fluid passages, respectively, when the fluid is flowed from the inlet to the outlet at a specified flow value.

In accordance with this configuration, by merely flowing the fluid at the specified flow value from the inlet to the outlet, the coefficient data can be obtained together from the flow values measured by the flow value measuring units, respectively. Therefore, the coefficient data used in the flow value measuring units provided in the plural measurement fluid passages, respectively, can be obtained efficiently.

Hereinafter, preferred embodiments of the present invention will be described with reference to the drawings. Throughout the drawings, the same or corresponding components are designated by the same reference symbols, and will not be described repeatedly.

(Gas Meter Device)

Figure 2:
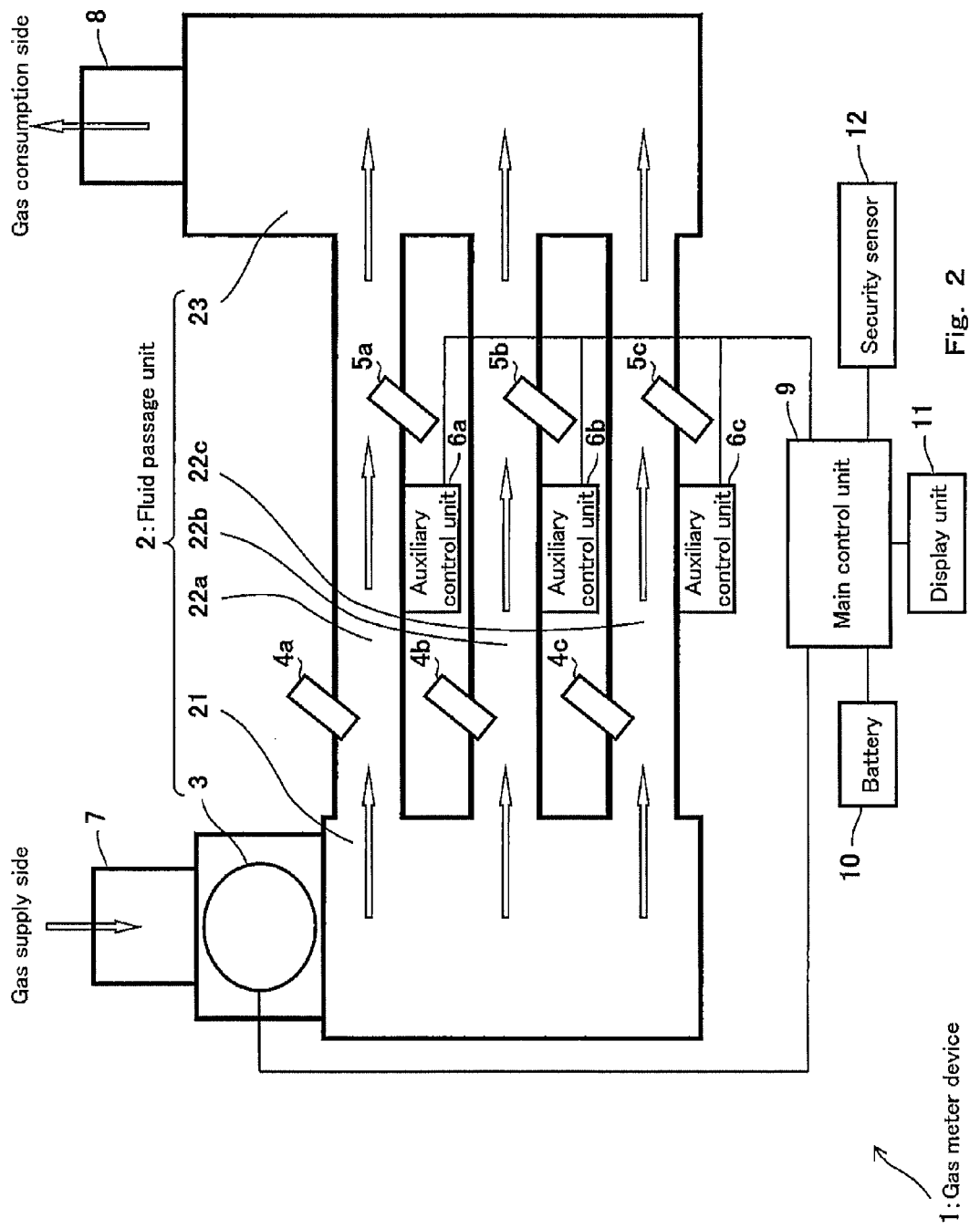
FIG. 2 is a schematic view showing the major components of the gas meter device according to the present embodiment.

First of all, the configuration of a gas meter device (fluid meter device) 1 according to the present embodiment will be described with reference to FIGS. 1 and 2. FIG. 1 is a block diagram showing the configuration associated with a flow value measuring process in the gas meter device 1 according to the present embodiment. FIG. 2 is a schematic view showing the major components of the gas meter device 1 according to the present embodiment.

The gas meter device 1 according to the present embodiment is an ultrasonic gas meter which is installed in the intermediate portion of a gas pipe and derives a consumed gas flow value (gas usage amount). Note that the gas meter device 1 is not limited to the ultrasonic gas meter. For example, the gas meter device 1 may be configured to derive the gas flow value by using a flow sensor utilizing an electronic detection principle, or an instantaneous flow meter such as a fluidic flow meter.

As shown in FIG. 2, the gas meter device 1 includes a fluid passage unit (fluid passage) 2, upstream ultrasonic sensors 4a to 4c, downstream ultrasonic sensors 5a to 5c, auxiliary control units 6a to 6c, an inlet 7, an outlet 8, a main control unit 9, a battery 10, a display unit 11, and a security sensor 12. Here, it is supposed that the gas flows in one direction inside the fluid passage unit 2 from the inlet 7 toward the outlet 8.

The inlet 7 is an entrance through which the gas supplied from a gas pipe at a supply side (gas supply pipe) flows into the gas meter device 1. In the gas meter device 1 according to the present embodiment, the inlet 7 is provided on the upper surface thereof to connect the gas supply pipe to the fluid passage unit 2.

The outlet 8 is an exit through which the gas flows out of the gas meter device 1 to a gas pipe at a consumption side (gas consumption pipe). In the gas meter device 1 according to the present embodiment, the outlet 8 is provided on the upper surface thereof to connect the gas consumption pipe to the fluid passage unit 2.

The fluid passage unit 2 is a tubular pipe which has a rectangular cross-section and through which the gas flows to be supplied to a customer. As shown in FIG. 2, the fluid passage unit 2 includes a shut-off valve 3, an inlet buffer 21, measurement fluid passages 22a to 22c, and an outlet buffer 23.

The measurement fluid passages 22a to 22c are fluid passages configured to measure the flow values (flow value of the gas flowing through the gas meter device 1) of the gas consumed. The measurement fluid passages 22a to 22c are configured to have an equal cross-sectional area or different cross-sectional areas. In a case where it is not necessary to explain the measurement fluid passages 22a to 22c in such a way that they are differentiated from each other, description will be given using the term "measurement fluid passage(s) 22."

The fluid passage unit 2 includes the inlet buffer 21 in a position which is upstream of the plural measurement fluid passages 22a to 22c, and the outlet buffer 23 in a position which is downstream of the plural measurement fluid passages 22a to 22c. The inlet buffer 21, the plural measurement fluid passages 22a to 22c, and the outlet buffer 23 communicate with each other. In the gas meter device 1 of the present embodiment, the measurement fluid passages 22a to 22c are configured to independently measure the flow values of the gas flowing between the inlet buffer 21 and the outlet buffer 23, respectively.

The gas meter device 1 of the present embodiment includes the shut-off valve 3 in a position which is upstream of the fluid passage unit 2 (upstream of the inlet buffer 21). The shut-off valve 3 is configured to close the fluid passages of the fluid passage unit 2, for example, in a case where an abnormality such as a gas leakage in a region from the gas meter device 1 to a gas device, is detected, in response to a request for shutting-off the fluid passage unit 2 from outside, or for other reason, to shut-off the gas flow. The shut-off valve 3 is capable of closing or opening the fluid passage between the inlet 7 and the inlet buffer 21, in response to a control command from the main control unit 9. The shut-off valve 3 is configured to include a valve disc (valve plug) (not shown) for closing the fluid passage of the fluid passage unit 2 and a stepping motor (not shown) which is a power source of the valve disc. More specifically, the shut-off valve 3 closes or opens the fluid passage of the fluid passage unit 2 as will be described below.

Specifically, in response to the control command output from the main control unit 9, a pulse current having a phase difference is applied to the coils (not shown) of a stator of the stepping motor of the shut-off valve 3. By the application of this current, the rotor (not shown) of the stepping motor is rotated in a forward direction. According to the forward rotation of the rotor, the valve disc advances toward a valve seat (not shown) and closes the fluid passage. In this way, the gas flow is shut-off in the gas meter device 1. Conversely, in a case where the fluid passage is opened, the stepping motor of the shut-off valve 3 is rotated in a reverse direction, and thereby the valve disc is moved away from the valve seat.

The upstream ultrasonic sensors 4a to 4c and the downstream ultrasonic sensors 5a to 5c mutually transmit and receive the ultrasonic wave. The upstream ultrasonic sensors 4a to 4c are provided in the measurement fluid passages 22a to 22c, respectively, and the downstream ultrasonic sensors 5a to 5c are provided in the measurement fluid passages 22a to 22c, respectively. In a case where it is not necessary to explain the upstream ultrasonic sensors 4a to 4c in such a way that they are differentiated from each other, description will be given using the term "upstream ultrasonic sensor(s) 4." In the same manner, in a case where it is not necessary to explain the downstream ultrasonic sensors 5a to 5c in such a way that they are differentiated from each other, description will be given using the term "downstream ultrasonic sensor(s) 5."

Pairs of the upstream ultrasonic sensors 4 and the downstream ultrasonic sensors 5 are configured to be activated in response to control commands output from the auxiliary control units 6a to 6c provided to correspond to the measurement fluid passages 22, respectively. In a case where it is not necessary to explain the auxiliary control units 6a to 6c in such a way that they are differentiated from each other, description will be given using the term "auxiliary control unit(s) 6."

Each of the upstream ultrasonic sensors 4 is attached to the upstream side wall of the corresponding measurement fluid passage 22, and each of the downstream ultrasonic sensors 5 is attached to the downstream side wall of the corresponding measurement fluid passage 22 such that the upstream ultrasonic sensor 4 and the downstream ultrasonic sensor 5 face each other. When the upstream ultrasonic sensor 4 receives an activation signal (control signal) from the main control unit 9 via the auxiliary control unit 6, the upstream ultrasonic sensor 4 outputs an ultrasonic wave toward the downstream ultrasonic sensor 5. The ultrasonic wave output from the upstream ultrasonic sensor 4 travels in an obliquely downward direction toward a downstream side inside the measurement fluid passage 22, and propagates toward the downstream ultrasonic sensor 5. On the other hand, when the downstream ultrasonic sensor 5 receives the activation signal from the main control unit 9 via the auxiliary control unit 6, the downstream ultrasonic sensor 5 outputs the ultrasonic wave toward the upstream ultrasonic sensor 4. The ultrasonic wave output from the downstream ultrasonic sensor 5 travels in an obliquely upward direction toward an upstream side inside the measurement fluid passage 22, and propagates toward the upstream ultrasonic sensor 4. The auxiliary control unit 6 measures the arrival times of these ultrasonic waves, and calculates the flow velocity of the gas flowing through the fluid passage unit 2 based on a difference between the arrival times. Then, the auxiliary control unit 6 derives the flow value by multiplying the flow velocity by the cross-sectional area of the fluid passage unit 2, or the like. After the auxiliary control unit 6 derives the gas flow value, it derives the total gas flow value of the whole gas meter device 1 based on the gas flow, and decides this total gas flow value as the estimated total flow value. The auxiliary control unit 6 sends the estimated total flow value to the main control unit 9.

The main control unit 9 is configured to control the operations of the respective sections of the gas meter device 1, and operate as follows, for example, as "control processes of the respective sections." The main control unit 9 determines whether or not there is an abnormality from the result of detection performed by the security sensor 12 which detects the abnormality, or determines whether or not there is a shut-off command for closing the measurement fluid passage formed inside the gas meter device 1, which is received from outside. When the main control unit 9 determines that there is an abnormality or it receives the shut-off command, it applies a current to the shut-off valve 3 to close the fluid passage of the fluid passage unit 2, as described above. Or, the main control unit 9 may cause the display unit 11 to display various information such as the flow value of the consumed gas. The display unit 11 can be realized by, for example, a CRT, a liquid crystal display, a plasma display, or an organic EL display.

Also, the main control unit 9 is able to decide the total gas flow value of the gas meter device 1, based on the estimated total gas flow values sent from the auxiliary control units 6. The "gas flow value measuring process" of the gas meter device 1 of the present embodiment will be described in detail later.

The auxiliary control unit 6 can be realized by, for example, LSI (large scale integration) for ultrasonic wave measurement. This ultrasonic wave measurement LSI includes an analog circuit which is capable of measuring the ultrasonic wave and a digital circuit which sequentially performs the operation for measuring transit time (propagation time) of the ultrasonic wave. In contrast, the main control unit 9 can be realized by, for example, CPU.

(Configuration Associated with Gas Flow Value Measuring Process)

Figure 3:
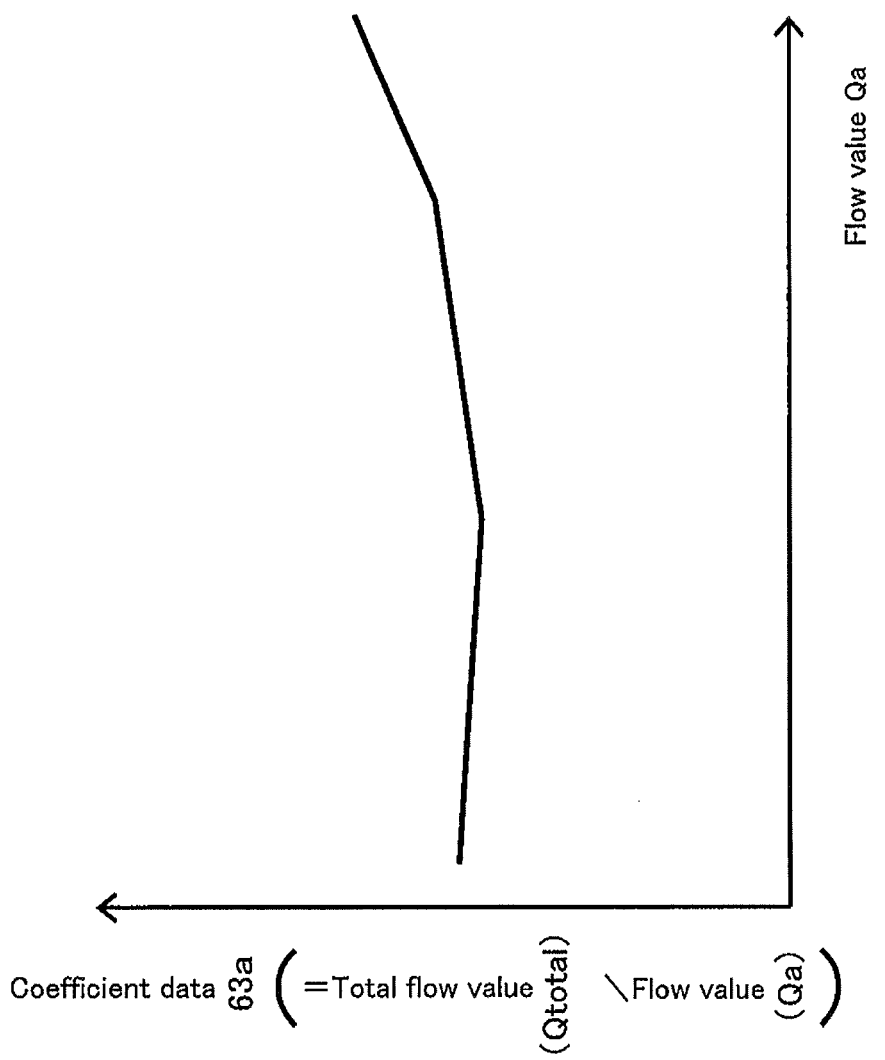
FIG. 3 is a graph showing the exemplary relation between coefficient data stored in a memory included in an auxiliary control unit and the flow value of the gas which has flowed through a measurement fluid passage, in the gas meter device according to the present embodiment.
Figure 4:
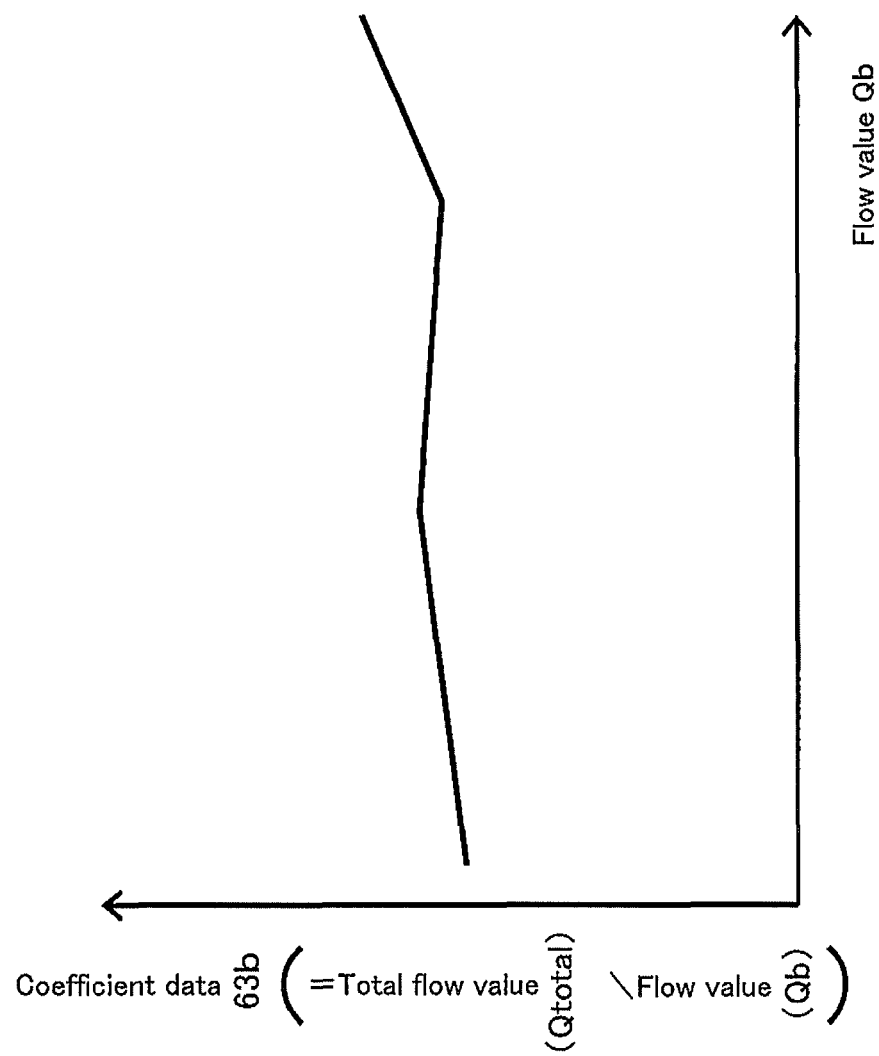
FIG. 4 is a graph showing the exemplary relation between the coefficient data stored in the memory included in the auxiliary control unit and the flow value of the gas which has flowed through the measurement fluid passage, in the gas meter device according to the present embodiment.
Figure 5:
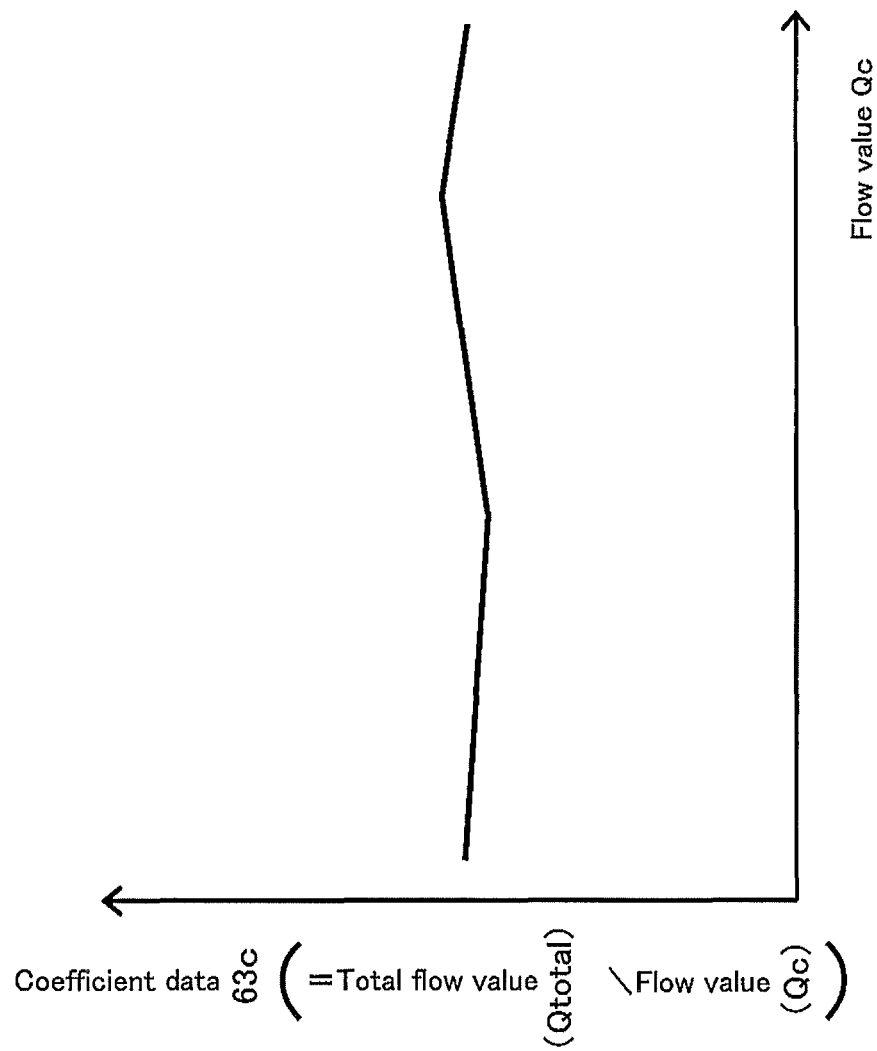
FIG. 5 is a graph showing the exemplary relation between the coefficient data stored in the memory included in the auxiliary control unit and the flow value of the gas which has flowed through the measurement fluid passage, in the gas meter device according to the present embodiment.

Hereinafter, the configuration associated with the "gas flow value measuring process" of the gas meter device 1 of the present embodiment will be described more specifically with reference to FIGS. 3 to 5, as well as FIG. 1. FIGS. 3 to 5 are graphs showing the exemplary relation between coefficient data and the gas flow values of the measurement fluid passages, in the gas meter device according to the present embodiment. Specifically, FIGS. 3 to 5 are graphical representation of the coefficient data tables 63 containing the correspondence between the flow values of the measurement fluid passages 22 and the coefficient data.

As shown in FIG. 1, the auxiliary control units 6a to 6c include total flow value estimation sections (total flow value estimation units) 60a to 60c, respectively, flow value measuring sections (flow value measuring units) 61a to 61c, respectively, and memories 62a to 62c, respectively, as the configuration associated with the "gas flow value measuring process". The memories 62a to 62c contain coefficient data tables 63a to 63c, respectively. The main control unit 9 includes a total flow value decision unit 91, as the configuration associated with the "gas flow value measuring process."

In cases where it is not necessary to distinguish the total flow value estimation sections 60a to 60c from each other, it is not necessary to distinguish the flow value measuring sections 61a to 61c from each other, it is not necessary to distinguish the memories 62a to 62c from each other, and it is not necessary to distinguish the coefficient data tables 63a to 63c from each other, these will be simply referred to as the total flow value estimation section(s) 60, the flow value measuring section(s) 61, the memory (memories) 62, and the coefficient data table(s) 63, respectively.

Each of the flow value measuring sections 61 derives the flow velocity per unit time, of the gas flowing through the measurement fluid passage 22 based on the above described difference between the arrival times of the ultrasonic waves, which are obtained by using the upstream ultrasonic sensor 4 and the downstream ultrasonic sensor 5, and then derives the flow value of the gas which has flowed through the measurement fluid passage 2 based on the flow velocity, the cross-sectional area of the measurement fluid passage 22, or the like. The upstream ultrasonic sensor 4, the downstream ultrasonic sensor 5, and the flow value measuring section 61 implement a flow value measuring unit of the present invention.

In the present embodiment, the gas meter device 1 is configured in such a manner that the upstream ultrasonic sensor 4 and the downstream ultrasonic sensor 5 mutually transmit and receive the ultrasonic wave plural times, once in every 2 seconds. Therefore, the gas meter device 1 of the present embodiment is configured to check a change in the gas flow value once in every 2 seconds.

Each of the total flow value estimation sections 60 derives the estimated total flow value of the gas which has flowed through the gas meter device 1 based on the gas flow value which is derived by the flow value measuring section 61, with reference to the coefficient data table 63 stored in the memory 62.

Each of the memories 62 is a readable and writable memory which contains information such as parameters used for the calculation performed by the auxiliary control unit 6. For example, the memory 62 can be realized by a semiconductor memory device such as a RAM or an EEPROM which is able to write and read data.

For example, as shown in FIG. 1, each of the memories 62 contains parameters (coefficient data) used to derive the total flow value (estimated total flow value) per unit time, of the gas which has flowed through the whole gas meter device 1, based on the flow value of the gas which has flowed through the measurement fluid passage 22, per unit time. To be more precise, the memory 62 contains the table indicating the correspondence (e.g., see FIGS. 3 to 5) between the coefficient data and the gas flow value of the measurement fluid passage 22.

As shown in FIGS. 3 to 5, the coefficient data tables 63*a* to 63*c* are defined in correspondence with the flow values of the gas flowing through the measurement fluid passages 22*a* to 22*c*, respectively. Specifically, as shown in FIGS. 3 to 5, the memories 62*a* to 62*c* contain as the coefficient data tables 63*a* to 63*c*, values obtained by dividing a total flow value (Qtotal) which is known in advance by the flow values (Qa to Qc) of the gas flowing through the measurement fluid passages 22*a* to 22*c*, respectively. The values of the coefficient data stored as the coefficient data tables 63*a* to 63*c* are varied depending on changes in the flow values of the gas flowing through the measurement fluid passages 22*a* to 22*c*, respectively. However, the coefficient data is not limited to these. For example, the coefficient data may be a fixed value irrespective of the magnitude of the flow values of the gas flowing through the measurement fluid passages 22*a* to 22*c*, respectively.

Each of the auxiliary control units 6 derives the estimated total flow value of the gas which has flowed through the whole gas meter device 1 from the flow value of the gas which has flowed through the measurement fluid passage 22, with reference to the coefficient data stored as the coefficient data table 63, and sends the estimated total flow value to the main control unit 9.

In the main control unit 9, the total flow value decision unit 91 decides the total flow value of the gas actually used, based on the estimated total gas flow values sent from the auxiliary control units 6*a* to 6*c*, respectively. More specifically, the total flow value decision unit 91 derives the average flow value of the estimated total flow values sent from the auxiliary control units 6*a* to 6*c*, respectively, and decides this average flow value as the total flow value of the gas actually used.

Figure 6:
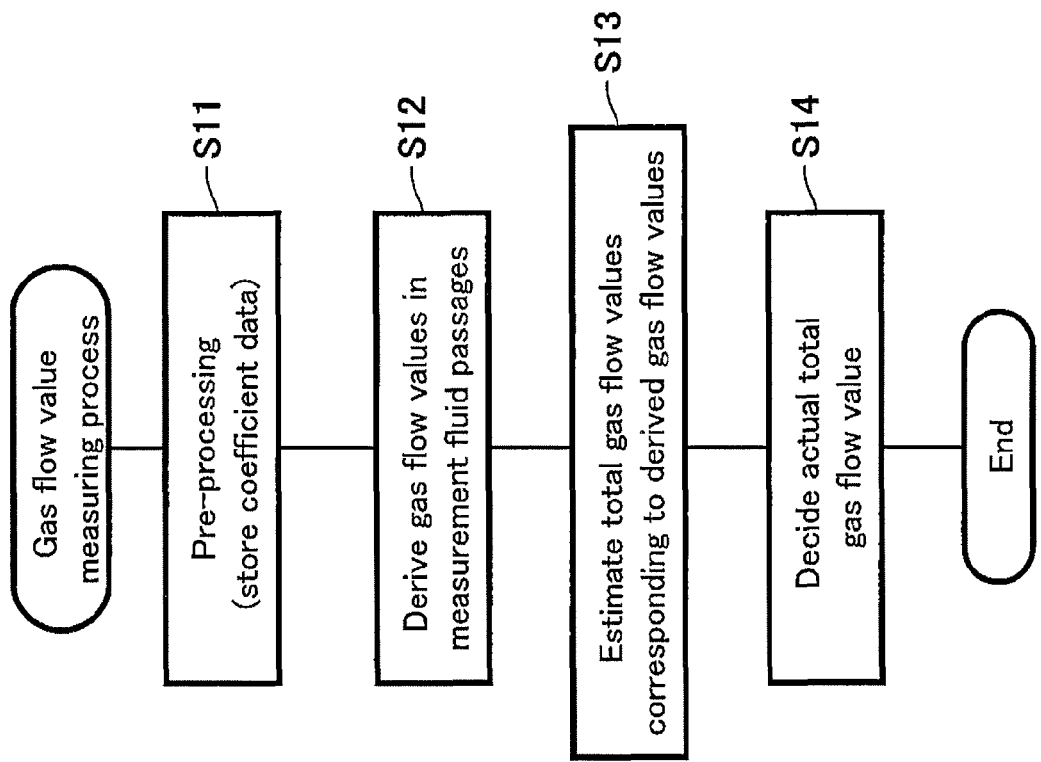
FIG. 6 is a flowchart showing the exemplary process flow in the gas meter device according to the present embodiment.

Next, the process flow of the "gas flow value measuring process" for deriving the total flow value of the gas flowing through the gas meter device 1, in the gas meter device 1 configured as described above, will be described with reference to FIG. 6. FIG. 6 is a flowchart showing the exemplary process flow in the gas meter device 1 according to the present embodiment.

(Gas Flow Value Measuring Process Method)

Initially, as pre-processing, the coefficient data tables 63*a* to 63*c* are stored in the memories 62*a* to 62*c*, respectively (step S11).

More specifically, the gas, the total flow value (Qtotal) of which is known in advance, is flowed through the inlet 7 of the gas meter device 1, and the flow values (Qa to Qc) measured in the measurement fluid passages 22*a* to 22*c*, respectively, at this time, are stored. Then, the coefficient data used to derive the total flow value (Qtotal) are calculated from the measured flow values (Qa to Qc), respectively. This operation is performed plural times while changing the total flow value (Qtotal), and the coefficient data tables 63 indicating the correspondences between the flow values and the coefficient data are created, and stored in the memories 62, respectively.

Although in the above described embodiment, the coefficient data corresponding to the measurement fluid passages 22*a* to 22*c*, are described as having different values (characteristics) in a specified flow value range, as shown in FIGS. 3 to 5, the operation need not be performed plural times while changing the total flow value (Qtotal), but may be performed once, as a matter of course, in a case where the relation between the coefficient data corresponding to the measurement fluid passages 22*a* to 22*c* and the flow values can be represented by a linear function graph.

After the above described pre-processing is performed, the gas meter device 1 is installed for actual use. A gas consumption device or the like connected to the gas meter device 1 starts to consume the gas. At this time, the measurement fluid passages of the fluid passage unit 2 are opened by the shut-off valve 3.

When the gas consumption device or the like starts to consume the gas, the gas flowing into the gas meter device 1 through the inlet 7 is divided to flow into the measurement fluid passages 22*a* to 22*c* through the inlet buffer 21, and then toward the outlet buffer 23. In the auxiliary control units 6*a* to 6*c*, the flow value measuring sections 61*a* to 61*c* derive the flow velocities of the gas flowing through the measurement fluid passages 22*a* to 22*c*, respectively, based on the differences of the arrival times of the ultrasonic waves which are measured by the upstream ultrasonic sensors 4*a* to 4*c* and the downstream ultrasonic sensors 5*a* to 5*c*. From the flow velocities, the auxiliary control units 6*a* to 6*c* calculate the gas flow values of the measurement fluid passages 22*a* to 22*c*, respectively (step S12).

In addition, the total flow value estimation sections 60*a* to 60*c* of the auxiliary control units 6 estimate the total flow values of the gas which has flowed through the whole gas meter device 1 from the calculated gas flow values, with reference to the coefficient data stored as the coefficient data tables 63a to 63c stored in the memories 62 (step S13). For example, the total flow value estimation section 60a obtains the coefficient data corresponding to the flow value Qa of the gas flowing through the measurement fluid passage 22a, with reference to the coefficient data table 63a. Then, the total flow value estimation section 60a calculates the estimated total flow value based on this coefficient data and the gas flow value Qa. Then, the auxiliary control units 6 send the estimated total gas flow values to the main control unit 9.

When the main control unit 9 receives the total gas flow values from the auxiliary control units 6, the total flow value decision unit 91 calculates the average flow value of these total gas flow values, and decides the calculated average flow value as an actual total flow value of the gas which has flowed through the gas meter device 1 (step S14).

(Advantages)

As described above, the gas meter device 1 of the present embodiment includes the plural measurement fluid passages 22a to 22c, the upstream ultrasonic sensors 4a to 4c provided in the measurement fluid passages 22a to 22c, respectively, and the downstream ultrasonic sensors 5a to 5c provided in the measurement fluid passages 22a to 22c, respectively, and is able to measure the gas flows of the measurement fluid passages 22a to 22c, respectively, by using the ultrasonic wave, and derive the total gas flow values (estimated total gas flow values) of the whole gas meter device 1 based on the gas flow values derived in the measurement fluid passages 22a to 22c, respectively, with reference to the coefficient data 63.

In summary, by preliminarily deriving the gas flow values of the measurement fluid passages 22a to 22c, when the gas is flowed at the specified flow value, and deriving the coefficient data from the specified flow value (specified total gas flow value) and the gas flow values of the measurement fluid passages 22, it becomes possible to manufacture the gas meter device 1 which is capable of measuring the total flow value of the gas flowing from the inlet 7 to the outlet 8. Although it is necessary to perform calibration for each of the separate measurement fluid passages and then perform calibration for the whole gas meter device assembled by connecting the plural measurement fluid passages in parallel, in the conventional example, this is not necessary in the gas meter device 1 of the present embodiment. As a result, time required for adjustment work in manufacturing steps can be reduced.

Moreover, the following advantages can be achieved. This will be described specifically.

For example, the auxiliary control units 6a to 6c may sum up the gas flow values derived in the measurement fluid passages 22a to 22c, respectively, to decide the total gas flow value of the whole gas meter device 1. However, in this configuration, if a correct gas flow value cannot be obtained in any one of the measurement fluid passages 22a to 22c, the total gas flow value of the whole gas meter device 1 cannot be obtained.

As an alternative configuration, only one measurement fluid passage 22 including the auxiliary control unit 6 which is capable of deriving the estimated total flow value and fluid passages which flow the gas therethrough as in the gas meter device of the present embodiment, may be provided such that measurement fluid passage 22 and the fluid passages are placed in parallel. In this case, also, if a failure occurs in any one of the upstream ultrasonic sensor 4, the downstream ultrasonic sensor 5 and the auxiliary control unit 6 in the measurement fluid passage 22, the total gas flow value of the whole gas meter device 1 cannot be obtained.

In contrast, in the gas meter device 1 of the present embodiment, as described above, the auxiliary control units 6a to 6c are configured to derive the estimated total flow values in the measurement fluid passages 22a to 22c, respectively, the total gas flow value of the whole gas meter device 1 can be decided by using the estimated total flow values in the measurement fluid passages 22 which are other than the measurement fluid passage 22 in which the gas flow value cannot be measured correctly.

The auxiliary control unit 6 of each of the measurement fluid passages 22 is configured to derive the estimated total flow value based on the gas flow value measured at a present time with reference to the coefficient data table 63. The flow values measured by the flow value measuring sections 61 in the measurement fluid passages 22 may in some cases contain errors with respect to a true value, due to design errors in the measurement fluid passage 22 through which the fluid flows. For this reason, the estimated total flow values derived in the measurement fluid passages 22 are non-uniform. Also, the estimated total flow values derived in the measurement fluid passages 22 may in some cases be non-uniform, with an increase/decrease in the total flow value of the gas flowing through the gas meter device 1, due to set accuracy of the coefficient data, etc.

However, the gas meter device 1 of the present embodiment includes many measurement fluid passages 22, and can derive the average flow value of the estimated total flow values derived from the gas flow values of the measurement fluid passages 22, respectively. Thus, the above stated non-uniformity can be compensated and the total gas flow value can be derived accurately.

In the gas meter device 1 of the present embodiment, the gas, the total flow value (Qtotal) of which is known in advance, is flowed through the inlet 7 of the gas meter device 1, and the coefficient data used to derive the total flow value (Qtotal) are calculated based on the flow values (Qa to Qc) measured in the measurement fluid passages 22a to 22c, respectively, at this time. In other words, when the gas, the total flow value (Qtotal) of which is known in advance, is flowed once, the coefficient data used in the auxiliary control units 6a to 6c included in the measurement fluid passages 22a to 22c can be obtained together.

Modified Example

The gas meter device 1 of the present embodiment is configured to store in the memories 62 the coefficient data tables 63 indicating the correspondences between the coefficient data and the gas flow values of the measurement fluid passages 22. However, this configuration is merely exemplary. For example, in a case where the relation between the coefficient data and the gas flow values of the measurement fluid passages 22 can be expressed as formulas, the formulas may be stored in the memories 62 instead of the coefficient data tables 63.

Although the gas meter device 1 of the present embodiment includes three measurement fluid passages 22, this is merely exemplary. For example, the gas meter device 1 of the present embodiment may include two measurement fluid passages 22, or four or more measurement fluid passages 22. Preferably, the number of the measurement fluid passages 22 is suitably set depending on the magnitude of the flow value of the gas used.

In the fluid passage unit 2 of the gas meter device 1 of the present embodiment, three measurement fluid passages 22 are placed between the input buffer 21 and the outlet buffer 23. Alternatively, in addition to these measurement fluid passages 22, a fluid passage which does not include the upstream ultrasonic sensor 4, the downstream ultrasonic sensor 5, and the auxiliary control unit 6, and flows the gas therethrough may be further provided. In other words, all of the fluid passages which are placed between the inlet buffer 21 and the outlet buffer 23 and which flows the gas between them need not be the measurement fluid passages 22, and a part of these fluid passages, preferably, three or more fluid passages may be the measurement fluid passages 22.

In the gas meter device 1 of the present embodiment, the total flow value decision unit 91 of the main control unit 9 decides the average flow value of the estimated total gas flow values derived by the auxiliary control units 6a to 6c, respectively, as the actual total gas flow value. However, this configuration is merely exemplary. For example, in the configuration in which many measurement fluid passages 22 are provided, the average flow value of the estimated total flow values derived from the gas flow values of the measurement fluid passages 22, except for a largest flow value of the estimated total flow values and a smallest flow value of the estimated total flow values, may be decided as the actual total gas flow value. Or, the average flow value of the estimated total flow values derived from the gas flow values of the measurement fluid passages 22, except for the estimated total flow value which is larger or smaller than the other estimated total flow values by a specified value or larger, may be decided as the actual total gas flow value.

In this configuration, for example, even when the measurement fluid passage 22 which cannot properly estimate the total gas flow value due to a failure in the upstream ultrasonic sensor 4 and the downstream ultrasonic sensor 5 exists, the actual total gas flow value may be decided from the estimated total flow values derived in the other measurement fluid passages 22, except for the estimated total flow value derived in the measurement fluid passage 22 with the failure. Therefore, the actual total gas flow value can be derived more accurately.

Alternatively, the total flow value decision unit 91 may be configured to decide as the actual total flow value a median value or a most-frequent value of the estimated total gas flow values derived in the auxiliary control units 6a to 6c, respectively. Preferably, by using a method which derives an approximation value which is closest to a true value from the distribution of the estimated total flow values actually obtained, the total flow value decision unit 91 decides the actual total gas flow value.

Although in the gas meter device 1 of the present embodiment, the auxiliary control units 6a to 6c include the memories 62a to 62c, respectively, this is merely exemplary. For example, the gas meter device 1 of the present embodiment may include one memory 62 which is accessible from the auxiliary control units 6a to 6c, and this memory 62 may be configured to store the gas flow values of the measurement fluid passages 22a to 22c and the coefficient data 63a to 63c such that the gas flow values correspond to the coefficient data 63a to 63c, respectively.

The gas meter device 1 of the present embodiment is configured such that the flow value measuring sections 61 of the measurement fluid passages 22 derive the gas flow values of the measurement fluid passages 22, respectively, and the total flow value estimation sections 60 derive the total flow values of the gas flowing through the gas meter device 1 based on the gas flow values. In other words, as the information relating to the flow values of the fluid flowing through the measurement fluid passages 22, the flow value measuring sections 61 directly derive the flow values, respectively. However, this configuration is merely exemplary. For example, the gas meter device 1 may include flow velocity measuring sections for measuring the flow velocities of the gas flowing through the measurement fluid passages 22, instead of the flow value measuring sections 61, and the total flow value estimation sections 60 may derive the total gas flow values of the gas meter device 1 based on the gas flow velocities measured by the flow velocity measuring sections. In brief, as the information relating to the flow values of the fluids flowing through the measurement fluid passages 22, the gas flow velocities may be derived.

In this configuration, each of the total flow value estimation sections 60 preserves the information of the diameter (cross-sectional area) of the measurement fluid passage 22, etc., and derives the flow value by multiplying the flow velocity of the gas flowing through the measurement fluid passage 22, which is measured by the flow velocity measuring section, by the information of the diameter (cross-sectional area) of the measurement fluid passage 22, etc. Then, the total flow value estimation section 60 estimates the total gas flow value of the gas meter device 1 by multiplying the flow value by the coefficient data 63.

Although in the above embodiment, the gas meter device 1 which measures the gas usage amount is exemplarily described, the measurement target fluid is not limited to the gas but may be any fluid.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A fluid meter device of the present invention is especially effectively applicable to a fluid meter device which includes plural fluid passages to measure the flow value of gas of a large amount, and measures a total fluid flow value from the flow values of fluids flowing though the plural fluid passages, respectively.

What is claimed is:
1. A fluid meter device comprising:
a fluid passage unit including plural measurement fluid passages provided in parallel;
an inlet through which a fluid flows into the fluid passage unit;
an outlet through which the fluid flows out of the fluid passage unit;
flow value measuring units provided in the plural measurement fluid passages, respectively, and configured to obtain information of flow values of fluids flowing through the measurement fluid passages, respectively;
memories configured to store coefficient data which are values corresponding to the measurement fluid passages, respectively and indicating a relation between the information of flow values of the fluids flowing through the measurement fluid passages, respectively, and a total flow value of the fluid flowing from the inlet to the outlet; and total flow value estimation units configured to estimate total flow values of the fluids corresponding to the measurement fluid passages, respectively, based on the information of the flow values which are obtained by the flow value measuring units, respectively, and the coefficient data stored in the memories.

2. The fluid meter device according to claim 1, further comprising:
a total flow value decision unit configured to obtain the total flow values of the fluids corresponding to the measurement fluid passages, which are estimated by the total flow value estimation units, respectively, and to decide the total flow value of the fluid flowing from the inlet to the outlet, based on the estimated total flow values.

3. The fluid meter device according to claim 2, wherein the total flow value decision unit is configured to derive an average flow value of the total flow values of the fluids corresponding to the measurement fluid passages, which are estimated by the total flow value estimation units, respectively, and to decide the average flow value as the total flow value of the fluid flowing from the inlet to the outlet.

4. The fluid meter device according to claim 3, wherein the total flow value decision unit is configured to derive the average flow value of the total flow values of the fluids corresponding to the measurement fluid passages, which are estimated by the total flow value estimation units, respectively, except for a largest flow value of the estimated total flow values and a smallest flow value of the estimated total flow values.

5. The flow meter device according to claim 1,
wherein the coefficient data stored in the memories are calculated based on the flow values of the fluids which are measured by the flow value measuring units provided in the measurement fluid passages, respectively, when the fluid is flowed from the inlet to the outlet at a specified flow value.

* * * * *